(12) United States Patent
Maeda

(10) Patent No.: US 6,311,511 B1
(45) Date of Patent: Nov. 6, 2001

(54) DEHUMIDIFYING AIR-CONDITIONING SYSTEM AND METHOD OF OPERATING THE SAME

(75) Inventor: Kensaku Maeda, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/529,951

(22) PCT Filed: Oct. 23, 1998

(86) PCT No.: PCT/JP98/04806

§ 371 Date: Apr. 21, 2000

§ 102(e) Date: Apr. 21, 2000

(87) PCT Pub. No.: WO99/22182

PCT Pub. Date: May 6, 1999

(30) Foreign Application Priority Data

Oct. 24, 1997 (JP) .................................................. 9-309614

(51) Int. Cl.[7] .............................. F25D 23/00; F25D 17/06
(52) U.S. Cl. ................................................. 62/271; 62/94
(58) Field of Search ........................... 62/271, 94, 238.3, 62/238.6

(56) References Cited

U.S. PATENT DOCUMENTS

| | | | |
|---|---|---|---|
| 4,887,437 | 12/1989 | Fenton et al. | 62/186 |
| 5,170,633 | * 12/1992 | Kaplan | 62/94 |
| 5,325,676 | 7/1994 | Meckler | 62/93 |
| 5,364,455 | 11/1994 | Komarneni et al. | 95/117 |
| 5,426,953 | * 6/1995 | Meckler | 62/271 |
| 5,448,895 | 9/1995 | Coellner et al. | 62/94 |
| 5,718,122 | 2/1998 | Maeda | 62/185 |
| 5,758,509 | 6/1998 | Maeda | 62/94 |
| 5,761,923 | 6/1998 | Maeda | 62/271 |
| 5,761,925 | 6/1998 | Maeda | 62/476 |
| 5,791,157 | 8/1998 | Maeda | 62/483 |
| 5,816,065 | 10/1998 | Maeda | 62/271 |
| 5,860,284 | * 1/1999 | Goland et al. | 62/94 |
| 5,931,015 | 8/1999 | Maeda | 62/271 |
| 5,943,874 | 8/1999 | Maeda | 62/271 |
| 5,950,442 | 9/1999 | Maeda et al. | 62/175 |
| 5,950,447 | 9/1999 | Maeda et al. | 62/271 |
| 5,966,955 | 10/1999 | Maeda | 62/238.3 |

FOREIGN PATENT DOCUMENTS

| | | |
|---|---|---|
| 61-138038 | 6/1986 | (JP) . |
| 8-14600 | 1/1996 | (JP) . |
| 8-189667 | 7/1996 | (JP) . |

* cited by examiner

*Primary Examiner*—William Doerrler
*Assistant Examiner*—Chen-Wen Jiang
(74) *Attorney, Agent, or Firm*—Armstrong, Westerman, Hattori, McLeland & Naughton, LLP

(57) ABSTRACT

The quantity of heat for cooling processing air as a low temperature heat source for regenerating a desiccant to be dehumidified, by a sensible heat exchanger before reaching a low temperature heat source heat exchanger is suppressed for thereby maintaining a heat load on the low temperature heat source beat exchanger and making it possible to handle an air-conditioning load with a small sensible heat factor, A dehumidifying air-conditioning system has a path (A) for processing air to be cooled by a low temperature heat source (115) of a heat pump (200) after moisture is adsorbed therefrom by a desiccant (103), a path (B) for regenerating air which, after being heated by a high temperature heat source (120) of the heat pump, passes through the desiccant that has adsorbed moisture to regenerate the desiccant, and a path (C) for cooling air for cooling the processing air by exchanging heat with the processing air from which moisture is adsorbed by the desiccant, the arrangement being such that the processing air and the regenerating air alternately flow through the desiccant. The dehumidifying air-conditioning system has means (400) for adjusting the flow rate of the cooling air which passes through a heat exchanger (300) for cooling the processing air to variably exchange heat between the processing air and the cooling air.

5 Claims, 10 Drawing Sheets

DEHUMIDIFYING AIR-CONDITIONING SYSTEM AND METHOD OF OPERATING THE SAME

TECHNICAL FIELD

The present invention relates to an air-conditioning system which employs a desiccant, and more particularly to an air-conditioning system which employs a heat pump as a heat source for heating regenerating air and cooling processing air.

BACKGROUND ART

FIG. 7 of the accompanying drawings shows an air-conditioning system comprising a combination of an absorption heat pump (200: represented by HP) as a heat source and an air-conditioning unit employing a desiccant, i.e., a so-called desiccant air-conditioning unit.

The air-conditioning system comprises an air-conditioning unit having a path A for processing air from which moisture has been adsorbed by a desiccant wheel 103, a path B for regenerating air which is heated by a heat source and thereafter passes through the desiccant wheel 103 that has adsorbed the moisture to desorb the moisture from the desiccant, and an air-conditioning unit having a sensible heat exchanger 104 between the processing air from which moisture has been adsorbed and the regenerating air to be regenerated by the desiccant wheel 103 and heated by the heat source, and an absorption heat pump 200. The regenerating air of the air-conditioning unit is heated by a heater 120 using the high temperature heat source of the absorption heat pump 200 as a heating source, for thereby regenerating the desiccant, and the processing air of the air-conditioning unit is cooled by a cooler 115 using the low temperature heat source of the absorption heat pump as a cooling heat source.

The air-conditioning system is arranged such that the absorption heat pump simultaneously cools the processing air and heats the regenerating air of the desiccant air-conditioning unit. Based on drive heat applied to the absorption heat pump from an external source, the absorption heat pump produces an effect of cooling the processing air. The desiccant is regenerated by the sum of the heat removed from the processing air by the operation of the heat pump and the drive heat applied to the absorption heat pump. Therefore, the drive energy applied from the external source is utilized in multiple ways for a high energy-saving effect.

In this air-conditioning system, as can be seen from an air cycle shown in the psychromretric chart shown in, FIG. 8 of the accompanying drawings, the cooling effect of a so-called desiccant cooling cycle, which is a cooling affect ($\Delta Q - \Delta q$) obtained as a result of a quantity of heat ($\Delta H$) applied to the regenerating air to regenerate the desiccant, is greater as the temperature of outside air (state Q) which exchanges heat with the processing air (state L) after the moisture has been adsorbed therefrom is lower. Therefore, as a means for increasing the cooling effect of the entire system, a system of cooling air for cooling the processing air of the state L may be provided separately from the system of the processing air. In this case, the cooling air is previously humidified to lower its temperature and exchanged heat with the processing air for thereby increasing the cooling effect.

An example in which the separate system of cooling air is added is shown in FIG. 9 of the accompanying drawings, and state changes of air in the example shown in FIG. 9 are shown in the psychrometric chart shown in FIG. 10 of the accompanying drawings.

The example shown in FIG. 9 differs from the system shown in FIG. 7 in that the regenerating air.(system B) is not used as the heat exchange medium of the sensible heat exchanger 104 which exchanges heat with the processing air (system A) from which moisture has been adsorbed by the desiccant wheel 104, but another system C of cooling air is provided, and outside air (OA) is introduced into the system C and humidified and cooled by a humidifier 165 into cooling air, which is used as the heat exchange medium of the sensible heat exchanger 104 to cool the processing air. With this arrangement, as shown in FIG. 10, the temperatures of the cooling air (state D) at an inlet of the sensible heat exchanger 104 is lowered by humidification, and the, flow rate of the cooling air can be increased. Therefore, the heat capacity of the cooling air is increased, and the temperature of the cooled processing air (state M) is made lower than the temperature in the system shown in FIG. 7, resulting in an increased cooling effect.

In the above air-conditioning system, however, for an air-conditioning load with a sensible heat factor, i.e., when the temperature is relatively low and the humidity is high as in a rainy season, the amount of heating by the heat pump to regenerate the desiccant to be dehumidified and the amount of cooling for processing the sensible heat of air are placed out of balance. If priority is given to dehumidification, then the amount of cooling by the low temperature heat source 115 of the heat pump becomes excessive, and the temperature of air supplied from the air-conditioning unit is lowered to excessively cool the air-conditioned space.

The present invention has been made in view of the above drawbacks. It is an object of the present invention to suppress the quantity of heat for cooling processing air as a low temperature heat source for regenerating a desiccant to be dehumidified, by a sensible heat exchanger before reaching a low temperature heat source heat exchanger, for thereby maintaining a heat load on the low temperature heat source heat exchanger and making it possible to handle an air-conditioning load with a small sensible heat factor.

DISCLOSURE OF INVENTION

According to an invention described in claim 1, there is provided a dehumidifying air-conditioning system having a path for processing air to be cooled by a low temperature heat source of a heat pump after moisture is adsorbed therefrom by a desiccant, a path for regenerating air which, after being heated by a high temperature heat source of the heat pump, passes through the desiccant that has adsorbed moisture to regenerate the desiccant, and a path for cooling air for cooling the processing air by exchanging heat with the processing air from which moisture is adsorbed by the desiccant, the arrangement being such that the processing air and the regenerating air alternately flow through the desiccant, characterized by means for adjusting the flow rate of the cooling air which passes through a heat exchanger for cooling the processing air to variably exchange heat between the processing air and the cooling air.

By adjusting the quantity of heat exchanged between the processing air and the cooling air, the dehumidifying air-conditioning system can flexibly dehumidify and cool air-conditioning loads with various sensible heat factors, and do not excessively cool an air-conditioned space in the dehumidifying operation.

According to an invention described in claim 2, there is provided a method of operating the dehumidifying air-conditioning system according to claim 1, characterized in that the dry-bulb temperature and the humidity of an air-conditioned space are detected, and if the detected dry-bulb temperature is lower than a preset value and the detected humidity is higher than a preset value, the flow of the cooling air is stopped.

If the detected dry-bulb temperature is lower than the preset value and the detected humidity is higher than the preset value, i.e., if it is detected when a so-called dehumidifying operation is required, the heat exchange between the processing air and the cooling air is stopped to keep a sensible heat load in a low temperature heat source heat exchanger of the heat pump, anti an air-conditioned space is prevented from being excessively cooled in the dehumidifying operation.

According to an invention described in claim 3, there is provided a dehumidifying air-conditioning system having a path for processing air to be cooled by a low temperature heat source of a heat pump after moisture is adsorbed therefrom by a desiccant, a path for regenerating air which, after being heated by a high temperature heat source of the heat pump, passes through the desiccant that has adsorbed moisture to regenerate the desiccant, and a path for cooling air for cooling the processing air by exchanging heat with the processing air from which moisture is adsorbed by the desiccant, the arrangement being such that the processing air and the regenerating air alternately flow through the desiccant, characterized in that a flow path zone for the processing air and the regenerating air which pass through the desiccant is divided into at least a first zone for adsorbing moisture from the processing air and a second zone for regenerating the desiccant with the regenerating air, the first and second zones being arranged such that the desiccant goes through the first zone and the second zone, and returns to the first zone, said heat pump being arranged for a low temperature heat source heat exchanger to exchange heat with the processing air and for a high temperature heat source heat exchanger to exchange heat with the regenerating air, the path for processing air being arranged to extend from an inlet for the processing air via said first zone, a first sensible heat exchanger, said low temperature heat source heat exchanger, and a first humidifier, to an outlet for the processing air, the path for regenerating air being arranged to extend from an inlet for the regenerating air via a second sensible heat exchanger, said high temperature heat source heat exchanger, said second zone, and the second sensible heat exchanger, to an outlet for the regenerating air, the path for cooling air being arranged to extend from an inlet for the cooling air via a second humidifier and the first sensible heat exchanger to an outlet for the cooling air, the arrangement being such that the processing air and the cooling air are in heat exchanging relationship to each other in the first sensible heat exchanger, and the regenerating air and the regenerating air are in heat exchanging relationship to each other in the second sensible heat exchanger, and the flow rate of said cooling air is adjusted to variably exchange heat between the processing air and the cooling air.

By thus adjusting the quantity of heat exchanged between the processing air and the cooling air, the dehumidifying air-conditioning system can flexibly dehumidify and cool air-conditioning loads with various sensible heat factors. In the dehumidifying operation, by suppressing the quantity of heat for cooling the processing air as the low temperature heat source for regenerating the desiccant by the first sensible heat exchanger before reaching the low temperature beat source heat exchanger, it, is possible to maintain a heat load on the low temperature heat source heat exchanger, and the air-conditioned space is prevented from being excessively cooled in the dehumidifying operation. It the sensible heat load for air-conditioning is large, a heat exchange is carried out by the first. sensible heat exchanger to lower the outlet temperature of the processing air in the heat pump, so that a cooling operation can be also performed.

According to an invention described in claim 4, the dehumidifying air-conditioning system according to claim 3 is characterized in that the desiccant is in the shape of a wheel, and rotates to go through the first zone and the second zone, and return to the first zone.

Since the desiccant is in the shape of a wheel and rotated, the process of adsorbing moisture with the desiccant and the process of regenerating the desiccant with the heat pump can successively be carried out.

According to an invention described in claim 5, there is provided a method of operating the dehumidifying air-conditions system according to claim 3 or 4 is characterized in that the heat pump comprises a vapor compression heat pump having a compressor, the dry-bulb temperature and humidity of air in an air-conditioned space are detected; if the dry-bulb temperature is higher than a preset value and the humidity is higher than a preset value, then in a first mode of operation, the cooling air is exchanged heat with the processing air, the first humidifier is inactivated, and the compressor is operated with a growing capability as the absolute value of the difference between the dry-bulb temperature and the preset value therefor increases; if the dry-bulb temperature is higher than the preset value and the humidity is lower than the preset value, then in a second mode of operation, the cooling air is exchanged heat with the processing air, the first humidifier is operated, and the compressor is operated with a growing capability as the absolute value of the difference between the dry-bulb temperature and the preset value therefor increases; if the dry-bulb temperature is lower than the preset value and the humidity is lower than the preset value, then in a third mode of operation, the cooling air is caused to exchange heat with the processing air while the flow rate of the cooling air is reduced as the absolute value of the difference between the dry-bulb temperature and the preset value therefor increases, the first humidifier is inactivated, and the compressor is operated with a decreasing capability as the absolute value of the difference between the dry-bulb temperature and the preset value therefor increases; and if the dry-bulb temperature is lower than the preset value and the humidity, is higher than the preset value, then in a fourth mode of operation, the flow of the cooling air is stopped, the first and second humidifiers are inactivated, and the compressor is operated with a growing capability as the absolute value of the difference between the humidity and the preset value therefor increases.

By thus detecting the sensible heat load and the latent heat load of the air-conditioning load and adjusting the compressor, the flow rate of the cooling air, and the humidifiers, both the dehumidifying operation and the cooling operation can flexibly be performed depending on the sensible heat factor of the air-conditioning load;

BEST MODE FOR CARRYING OUT THE INVENTION

Embodiments of dehumidifying air-conditioning systems according to the present invention will be described below with reference to the drawings.

Figure 1:
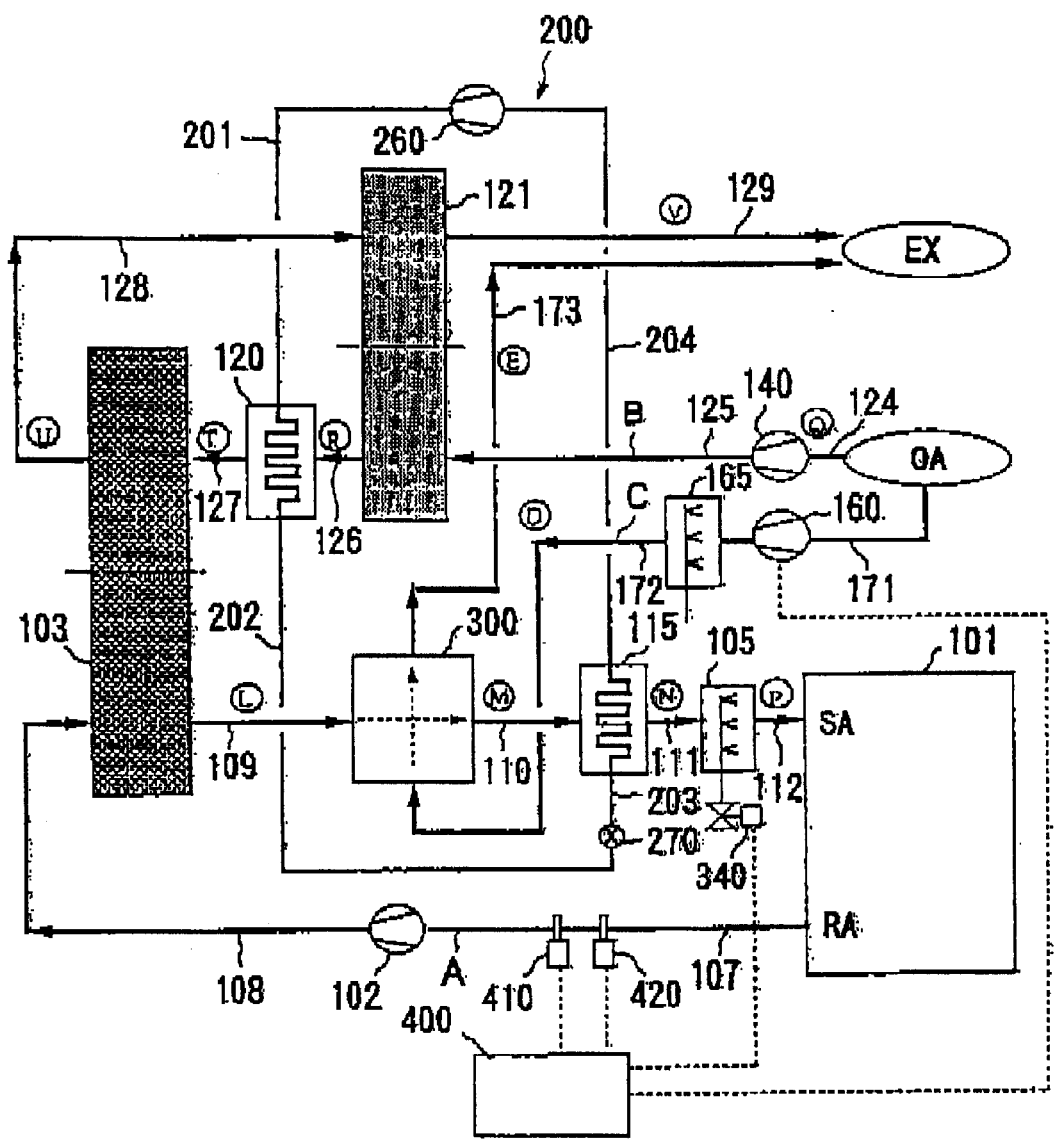
FIG. 1 is a view showing a basic arrangement of a dehumidifying air-conditioning system according to a first embodiment of the present invention.

FIG. 1 is a view showing a basic arrangement of a dehumidifying air-conditioning system according to a first embodiment of the present invention.

In this embodiment, a heat pump 200 comprises a vapor compression heat pump. The vapor compression heat pump comprises a compressor 260, a low temperature heat source heat exchanger (evaporator) 115, a high temperature heat source heat exchanger (condenser) 120, and an expansion valve 270, forming a vapor compression refrigeration cycle. In the evaporator 115, a low-pressure refrigerant is in heat exchanging relationship to processing air that has passed through a desiccant wheal 103, and in the condenser 120, at high-pressure refrigerant is in heat exchanging relationship to regenerating air that is to pass through the desiccant wheel 103.

Figure 9:
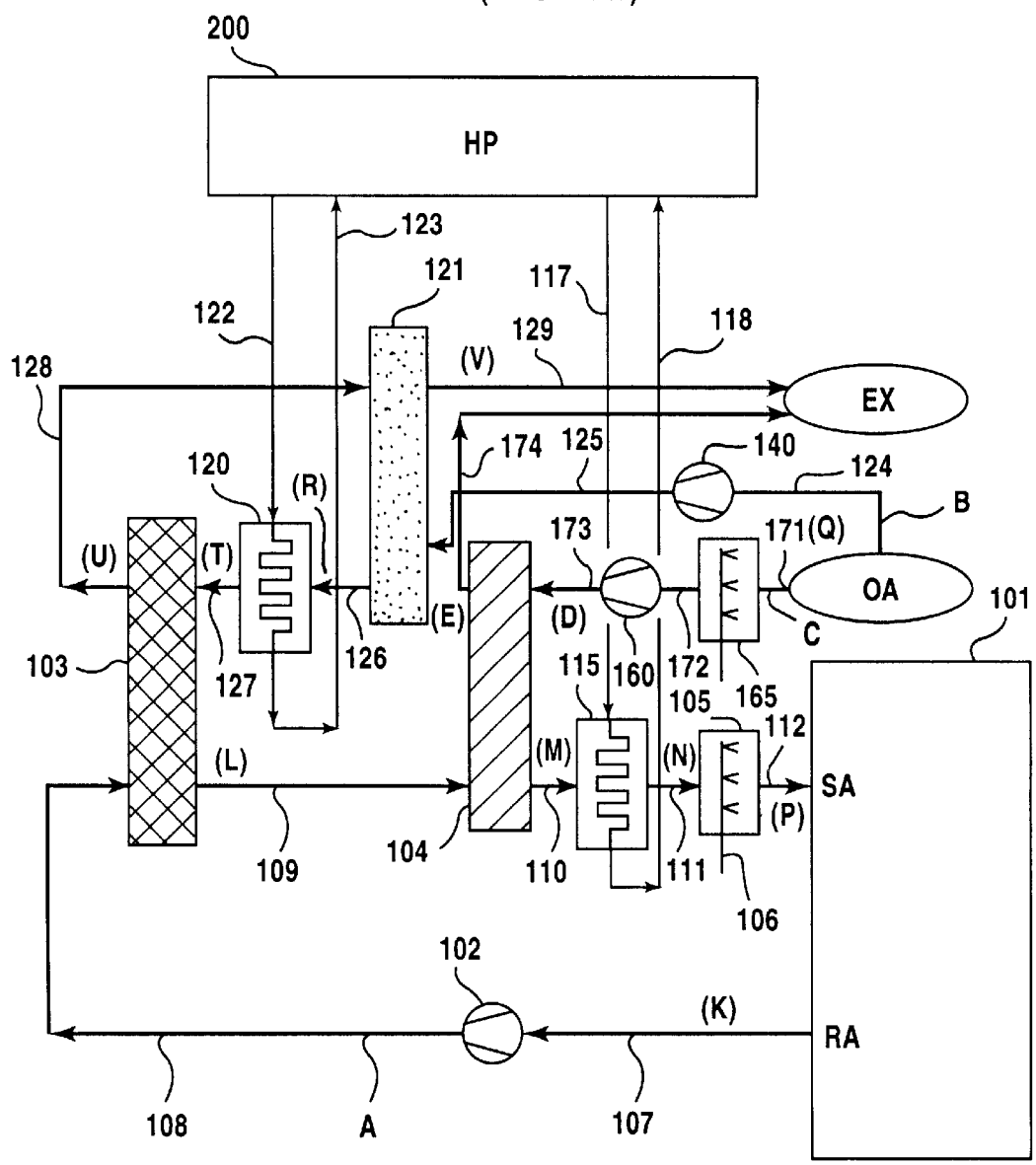
FIG. 9 is a view showing an air-conditioning system which has a separate system of cooling air.

The desiccant wheel 103 is arranged such that a desiccant rotates in given cycles across both a processing air path A and a regenerating air path B, as in the case of the system described with reference to FIG. 9. The processing air path A connects an air-conditioned space to an inlet port of a fan 102 for introducing return air via a path 107. The fan 102 has an outlet port connected to a first zone of the desiccant wheel 103 for performing a process of adsorbing moisture, via a path 108. The desiccant wheel 103 has an outlet for processing air which is connected to a first sensible heat exchanger 300 which is in heat exchanging relationship to cooling air, via a path 109. The sensible heat exchanger 300 has an outlet for processing air which is connected to an evaporator (cooler) 115 via a path 110. The evaporator 115 has an outlet for processing air which is connected to a humidifier 105 via a path 111. The humidifier 105 has an outs for processing air which is connected to a processing air outlet as an air supply port via a path 112. The processing air path A thus forms a cycle for processing air.

The regenerating air path B connects an inlet port of a fan 140 for introducing outside air which will serve as regenerating air, via a path 124. The fan 140 has an outlet port connected to a low-temperature fluid passage in a second sensible heat exchanger 121 which is in heat exchanging relationship to processing air that has regenerated the desiccant. The second sensible heat exchanger 121 has an outlet for low-temperature regenerating air which is connected to a condenser 120 via a path 126. The condenser 120 has an outlet for regenerating air which is connected to a second zone of the desiccant wheel 103 for performing a process of regenerating the desiccant with regenerating air, via a path 127. The second zone of the desiccant wheel 103 for performing the process of regenerating the desiccant with regenerating air has an outlet for regenerating air which is connected to a high-temperature fluid passage of the second sensible heat exchanger 121 via a path 128. The second sensible heat exchanger 121 has a high-temperature fluid passage outlet connected to the external space via a path 129. The regenerating air path B thus forms a cycle for introducing regenerating air from the external space and discharging regenerating air into the external space.

A cooling air path C connects an inlet port of a fan 160 for introducing outside air which will serve as cooling air, via a path 171. The fan 160 has an outlet port connected to a heat exchanger 300 which is in heat exchanging relationship to the processing air, via a path 172. The heat exchanger assembly 300 is arranged such that the cooling air flows upwardly in the vertical direction and the processing air flows horizontally for a heat exchange to be carried out therebetween. The heat exchanger 300 has an outlet for the cooling air which is connected to the external space via a path 173, The cooling air path C thus forms a cycle for introducing cooling air from the external space and discharging the cooling air into the external space.

Figure 2:
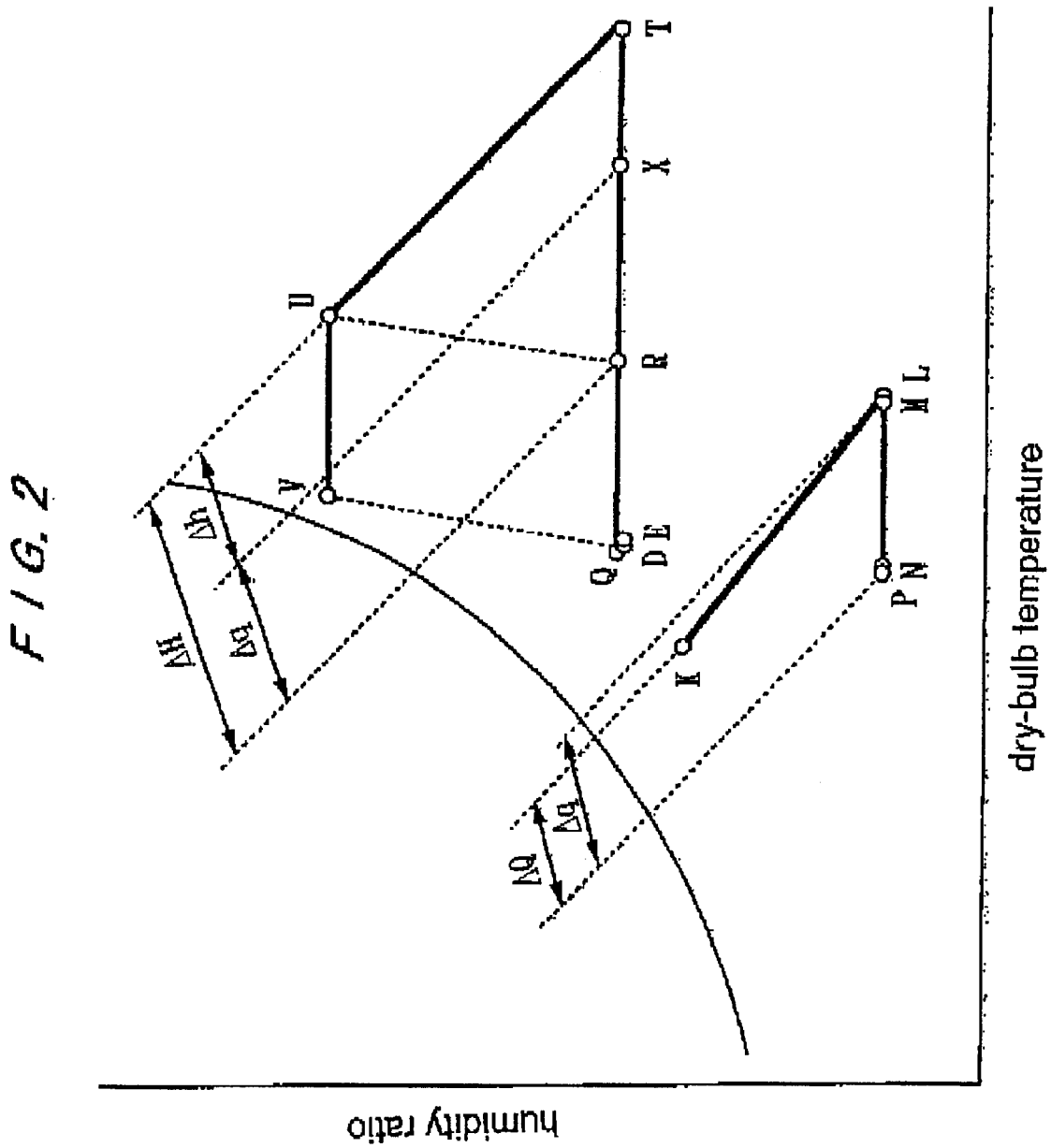
FIG. 2 is a psychrometric chart illustrative of operation of the dehumidifying air-conditioning system, according to the first embodiment of the present invention.

Circled alphabetical letters D–V in FIG. 1 are representative of respective states of air which correspond to those shown in FIG. 2.

As in the case of conventional air-conditioning systems, the desiccant which rotates in given cycles across both the processing air path A and the regenerating air path B is divided into the first zone which is connected to the processing air path A via the paths 108, 109 for performing the process of adsorbing moisture, and the second zone which is connected to the regenerating air path B via the paths 127, 128 for performing the process of regenerating the desiccant with the regenerating air. The desiccant goes through the first zone and the second zone, and returns to the first zone.

A dry-bulb temperature and humidity of an air-conditioned space 101 are detected respectively by a temperature sensor 410 and a humidity sensor 420 that are disposed in the return air path 107. The sensors 410, 420 supply signals to a controller 400. If the detected dry-bulb temperature is lower than a preset value and the detected humidity is higher than a preset value, then the controller 400 turns off the cooling air fan 160 and a water supply valve 340 of the humidifier 105 to stop the flow of the cooling air. Otherwise, the controller 400 operates the cooling air fan 160. In this manner, the supply of the cooling air to the heat exchanger which cools the processing air is selectively turned on or off for performing a selective heat exchange between the processing air and the cooling air.

The vapor compression heat pump cycle of the desiccant air-conditioning system thus constructed will be described below. The refrigerant is evaporated in the evaporator (cooler) 115 by depriving heat of the processing air which has been dehumidified by the desiccant wheel 103, drawn into the compressor 260 via the path 204 and compressed thereby. The refrigerant then flows via the path 201 into the high temperature heat source heat exchanger (condenser)

120 in which it discharges the super heat and condensing latent heat of the refrigerant into the regenerating air before it flows into the desiccant wheel 103. Thereafter, the refrigerant flows through the path 202 to reach the expansion valve 270 in which it is reduced in pressure and expanded, and flows back into the evaporator (cooler) 115.

Figure 10:
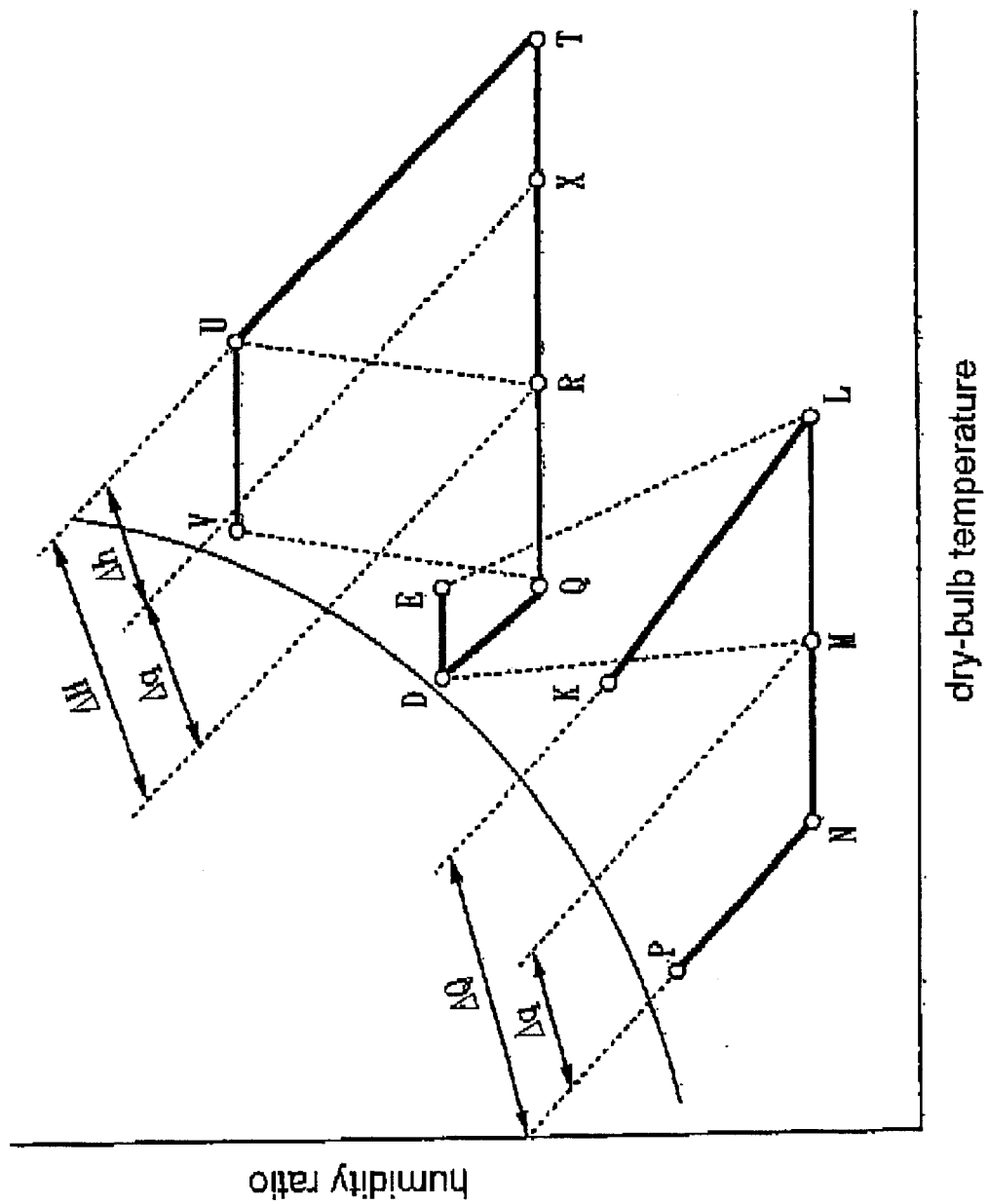
FIG. 10 is a psychrometric chart illustrative of operation of the air-conditioning system shown in FIG. 9.

Operation of the dehumidifying air-conditioning system which uses the heat pump 200 as a heat source will be described below with reference to the psychrometric charts shown in FIGS. 2 and 10.

First, a mode of operation in which the fan 160 is turned off to stop the flow of the cooling air if the detected dry-bulb temperature is lower than a preset value and the detected humidity is higher than a preset value, will be described below.

Introduced return air (processing air: state K) is drawn via the path 107 by the fan 102, increased in pressure, and supplied via the path 108 to the first zone of the desiccant wheel 103 where moisture in the air is adsorbed by the desiccant. In the first zone of the desiccant wheel 103 the humidity, ratio of the air is lowered, and the temperature of the air is increased by the heat of adsorption (state L). The air whose humidity is lowered and temperature is increased is sent via the path 109 to the first sensible heat exchanger 300. Since no cooling air flows in the first sensible heat exchanger 300, the air flows through the first sensible heat exchanger 300 (state M=L) and flows via the path 110 into the evaporator (cooler) 115 which cools the air (state N). The cooled processing air is delivered to the humidifier 105. Since the water supply valve 340 is closed based on a detected low room temperature and a detected high room humidity, the humidifier 105 does not humidify the processing air (state P=N). The processing air is returned via the path 112 as supply air to the air-conditioned space.

The desiccant wheel is regenerated as follows: outside air (state Q) to be used as regenerating air is drawn via the path 124 by the fan 140, increased in pressure, and supplied to the sensible heat exchanger 121 where the air exchanges heat with the regenerating air (state U) that has regenerated the desiccant and is increased in temperature (state R). The regenerating air flows via the path 126 into the condenser 120 where the regenerating air is heated by the refrigerant and increased in temperature (state T). The regenerating air which has left the condenser 220 passes through the second zone of the desiccant wheel 103 for regenerating the desiccant with the, regenerating air, removes moisture from the desiccant wheel 103 to regenerate the desiccant wheel 103 (state U). The regenerating air (state U) which has passed through the desiccant wheel 103 flows via the path 128 into the sensible heat exchanger 121 where it is reduced in temperature (state V) by exchanging heat with the regenerating air (state Q) prior to regenerating the desiccant. The regenerating air is then discharged via the path 129 as discharged air into the external space. The cooling air does not flow because the fan 160 is inactivated.

In the above mode of operation in which the fan 160 is turned off to stop the flow of the cooling air if the detected dry-bulb temperature is lower than a preset value and the detected humidity is higher than a preset value, the state (state M) of the outlet of the first sensible heat exchanger 300 for the processing air is represented by a high temperature as it is not cooled by the cooling air. Hence, the temperature of the processing air at the outlet of the evaporator 115 of the heat pump 200 is high. Since a heat source that can be recovered by the low temperature heat Source of the heat pump 200 is ensured, a heat source for regenerating the desiccant can be ensured which is discharged by the high temperature heat source of the heat pump 200 without lowering the room temperature.

Next, a mode of operation in which the fan 160 is turned on to cause the cooling air to flow if the detected dry-bulb temperature is higher than the preset value and the detected humidity is higher than the preset value, will be described below, This mode of operation does not differ from the operation shown in FIG. 10, but is carried out as follows: Introduced return air (processing airs state K) is drawn via the path 107 by the fan 102, increased in pressure, and supplied via the path 108 to the first zone of the desiccant wheel 103 where moisture in the air is adsorbed by the desiccant. In the first zone of the desiccant wheel 103, the humidity ratio of the air is lowered, and the temperature of the air is increased by the heat of adsorption (state L). The air whose humidity is lowered and temperature is increased is sent via the path 109 to the first sensible heat exchanger 300 where the air is cooled by a heat exchange with the cooling air (state M). The cooled air flows via the path 110 into the evaporator (cooler) 115 which cools the air (state N). The cooled processing air is delivered to the humidifier 105 where the temperature of the air is lowered in an isenthalpic process by the way of water injection or evaporative cooling (state P), after which the air is returned via the path 112 as supply air to the air-conditioned space.

As in the case of the foregoing mode of operation, the desiccant wheel is regenerated as follows: Outside air (state Q) to be used as regenerating air is drawn via the path 124 by the fan 140, increased in pressure, and supplied to the sensible heat exchanger 121 where the air exchanges heat with the regenerating air (state U) that has regenerated the desiccant and is increased in temperature (state R). The regenerating air flows via the path 126 into the condenser 120 where the regenerating air is heated by the refrigerant and increased in temperature (state T). The regenerating air which has left the condenser 220 passes through the second zone of the desiccant wheel 103 for regenerating the desiccant with the regenerating air, removes moisture from the desiccant wheel 103 to regenerate the desiccant wheel 103 (state U). The regenerating air (state U) which has passed through the desiccant wheel 103 flows via the path 128 into the sensible heat exchanger 121 where it is reduced in temperature (state V) by exchanging heat with the regenerating air (state Q) prior to regenerating the desiccant. The regenerating air is then discharged via the path 129 as discharged air into the external space.

The cooling air cools the processing air as follows: The outside air (state Q) used as the cooling air is drawn via the path 171 by the tan 160, increased in pressure, and supplied to the humidifier 165 where the temperature of the air is lowered in an isenthalpic process by the way of water injection or evaporative cooling (state D), after which the air is delivered to the first sensible heat exchanger 300 where it is reduced in temperature by exchanging heat with the cooling air (state E). The air then leaves the first sensible heat exchanger 300, and is discharged via the path 173 as discharged air into the external space.

In the above mode of operation in which the fan 160 is turned on to cause the cooling air to flow if the detected dry-bulb temperature is higher than the preset value and the detected humidity is higher than the preset value, i.e., in the so-called cooling operation, the state (state M) of the outlet of the first sensible heat exchanger 300 for the processing air is represented by a temperature lower than the temperature in the above dehumidifying operation as it is cooled by the cooling air. Hence, the temperature of the processing air at the outlet of the evaporator 115 of the heat pump 200 is low. Since the low-temperature processing air capable of handling a sensible heat load is produced, the ordinary so-called cooling operation which can handle both sensible and latent heat loads can be carried out, even when not in the dehumidifying operation.

Figure 3:
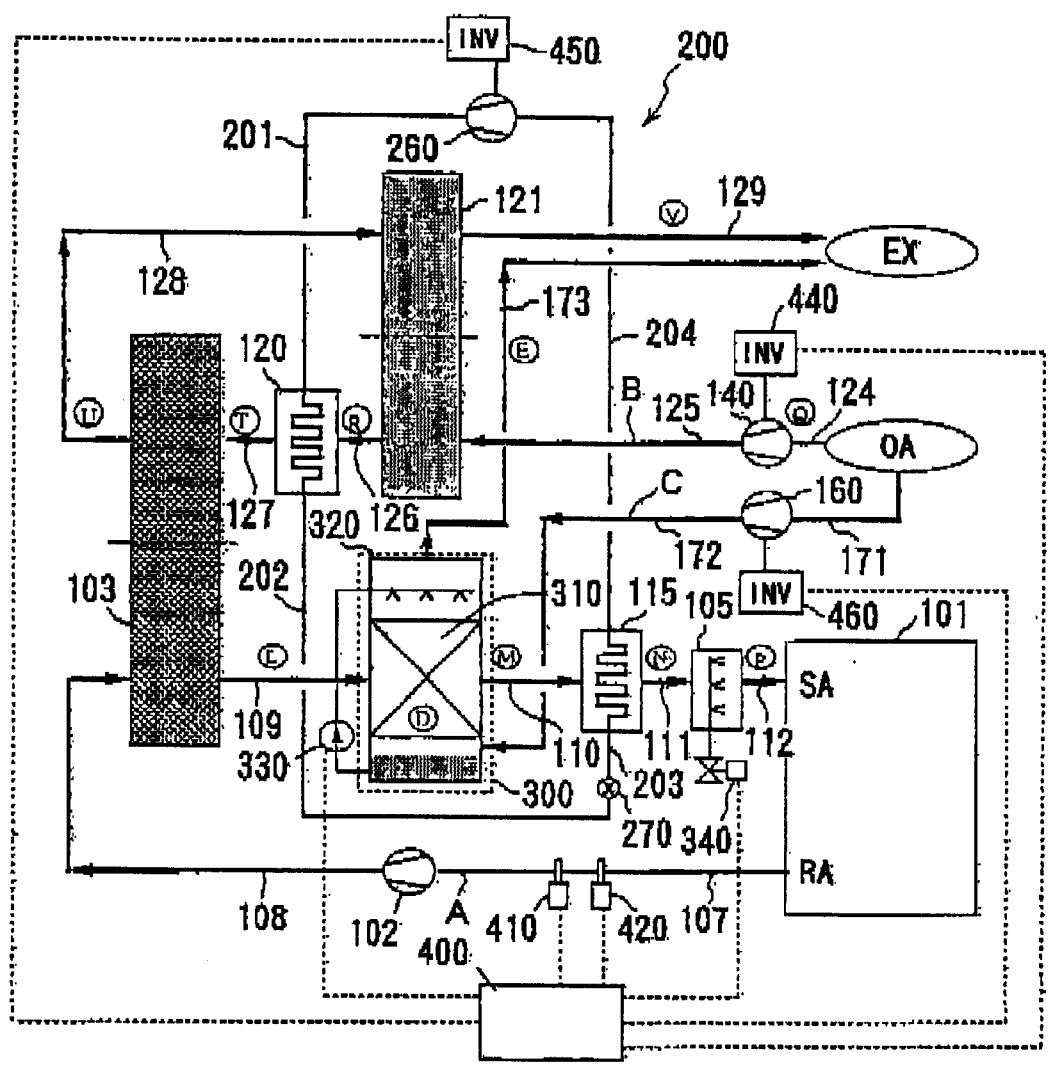
FIG. 3 is a view showing a basic arrangement of a dehumidifying air-conditioning system according to a second embodiment of the present invention.

FIG. 3 shows a basic arrangement of a dehumidifying air-conditioning system according to a second embodiment of the present invention.

In the second embodiment, the processing air path A and the regenerating air path B are of the same arrangement as those of the first embodiment shown in FIG. 1, and only the cooling air path C is of an arrangement, slightly different from that of the first embodiment shown in FIG. 1. Specifically, the cooling air path C connects an inlet port of the fan 160 for introducing outside air which will serve as cooling air, via the path 171. The fan 160 has an outlet port connected via the path 172 to a plate, cross flow type heat exchanger element 310 in a heat: exchanger assembly 300 which is in heat exchanging relationship to the processing air. The heat exchanger assembly 300 is arranged such that in the plate cross flows type heat exchanger element 310, the cooling air flows upwardly in the vertical direction and the processing air flows horizontally separately from the cooling air for a heat exchange to be carried out therebetween. Water is sprayed by a pump 330 downwardly onto a heat transfer surface for the cooling air of the plate cross flow types heat exchanger element 310, wetting the heat transfer surface for the cooling air with the water. The heat exchanger assembly 300 has an outlet for the cooling air which is connected to the external space via the path 173. The cooling air path C thus forms a cycle for introducing cooling air from the external space and discharging the, cooling air into the external space.

The cooling air in the above cycle thus arranged cools the processing air as follows: The outside air (state Q) used an the cooling air is drawn via the path 171 by the fan 160, increased in pressure, and supplied to the heat exchanger assembly 300 where the temperature of the air is lowered in an isenthalpic process by the evaporation of the downwardly sprayed water (state D ), after which the air exchanges heat with the cooing air via the wet heat transfer surface of the plate cross flow type heat exchanger element 310. Since the air undergoes a change of state along a saturation curve of a relative humidity from 95 to 100% due to the evaporation of the water on the heat transfer surface, the air is slightly increased in temperature (state A), leaves the heat exchanger assembly 300, and is discharged via the path 173 as discharged air into the external space. In this embodiment as described above, the heat exchanger element 310 for exchanging heat between the processing air and the cooling air comprises a plate cross flow type heat exchanger element, the cooling air flows upwardly in the vertical direction and the processing air flows horizontally, and water is sprayed downwardly onto the heat transfer surface for the cooling air to wet the heat transfer surface with the water with this arrangement, the heat exchanger has an increased level of performance, and can achieve the same high level of performance as a rotary heat exchanged with a small NTU (number of thermal unit) in spite of the cross flow type heat exchanger. However, details of the heat exchanger will not be described below as it does not fall in the scope of claims of the present invention.

In this embodiment, a controller 400 provided as a control device receives signals from the dry-bulb temperature sensor 410 and the humidity sensor 420 that are disposed in the return air path 107 extending from the air-conditioned space. The controller 400 also controls an inverter 460 of the fan 160 for the cooling air to regulate the rotational speed thereof, adjusts the opening of a water supply valve 340 of the humidifier 105, controls an inverter 450 of the refrigerant compressor 260 to regulate the rotational speed thereof, and controls an inverter 440 of the fan 140 for the regenerating air to regulate the rotational speed thereof.

The dehumidifying air-conditioning system is operated in various modes of operation as shown in Table 1. Specifically, in a first mode of operation (dehumidifying cooling mode), the dry-bulb temperature and humidity of air in the air-conditioned space are detected, and if the dry-bulb temperature is higher than a preset value and the humidity is higher than a preset value, then the fan 460 for the cooling air is rotated at a rated rotational speed, and the humidifier 105 is inactivated. In this case, the water injection pump 330 of the heat exchanger assembly 300 is operated, and the compressor 260 is operated with a growing capability as the absolute value of the difference between the dry-bulb temperature and the preset value therefor increases, with the flow rate of the regenerating air being proportional to the capability (rotational speed) of the compressor 260.

TABLE 1

Various modes of operation and settings

| Mode of operation | Dehumidifying cooling | Cooling | Weak cooling | De-humidifying |
|---|---|---|---|---|
| Compressor capability setting | Controlled by dry-bulb temperature | Controlled by dry-bulb temperature | Controlled by dry-bulb temperature | Controlled by humidity |
| Rate of regenerating air | Proportional to the capability of compressor | Proportional to the capability of compressor | Proportional to the capability of compressor | Proportional to the capability of compressor |
| Rate of cooling air | Rated rotational speed | Rated rotational speed | Controlled by dry-bulb temperature | Stopped |
| Water injection pump 330 | Operated | Operated | Inactivated | Inactivated |
| Humidifying valve 340 | Closed | Controlled by dry-bulb temperature | Closed | Closed |
| Dry-bulb temperature sensor signal | High | High | Low | Low |
| Humidity sensor signal | High | Low | Low | High |

In a second mode of operation (cooling mode), if the dry-bulb temperature is higher than the preset value and, the humidity is lower than the preset value, then the fan 460 for the cooling air is rotated at the rated rotational speed, and the humidifier 105 is operated to increase the amount of humidification as the absolute value of the, difference between the dry-bulb temperature and the preset value therefor increases. In this case, the water injection pump 330 of the heat exchanger 300 is operated, and the compressor 260 is operated with a growing capability as the absolute value of the difference between the dry-bulb temperature and the preset value therefor increases, with the flow rate of the regenerating air being proportional to the capability (rotational speed) of the compressor 260.

In a third mode of operation (weak cooling mode), if the dry-bulb temperature is lower than the preset value and the humidity is lower than the preset value, then the fan 460 for the cooling air is rotated at a rotational speed which decreases as the absolute value of the difference between the dry-bulb temperature and the preset values therefor increases, and the humidifier 105 is inactivated. In this case, the water injection pump 330 of the heat exchanger 300 is inactivated, and the compressor 260 is operated with a growing capability, as the absolute value of the difference between the dry-bulb temperature and the preset value therefor increases, with the flow rate of the regenerating air being proportional to the capability (rotational speed) of the compressor 260.

In a fourth mode of operation (dehumidifying mode), if the dry-bulb temperature is lower than the preset value and the humidity is higher than the preset value, then the fan 460 for the cooling air is inactivated, the humidifier 105 in inactivated, and the water injection pump, 330 of the heat exchanger 300 is inactivated. In this case, the compressor 260 is operated with a growing capability as the absolute value of the difference between the dry-bulb temperature and the preset value therefor increases, with the flow rate of the regenerating air being proportional to the capability (rotational speed) of the compressor 260.

The humidity used herein is preferably representative humidity ratio. However, the humidity sensor 320 may be a relative humidity sensor, and humidity ratio may be calculated from a signal from such a relative humidity sensor and a signal from the dry-bulb temperature sensor 310. Similarly, an enthalpy sensor may be used, and humidity ratio may be calculated from a signal from such an enthalpy sensor and a signal from the dry-bulb temperature sensor 310. The humidity sensor 320 may comprise. a dew-point sensor equivalent to a humidity ratio sensor.

Details of the modes of operation will be described below.

Figure 4:
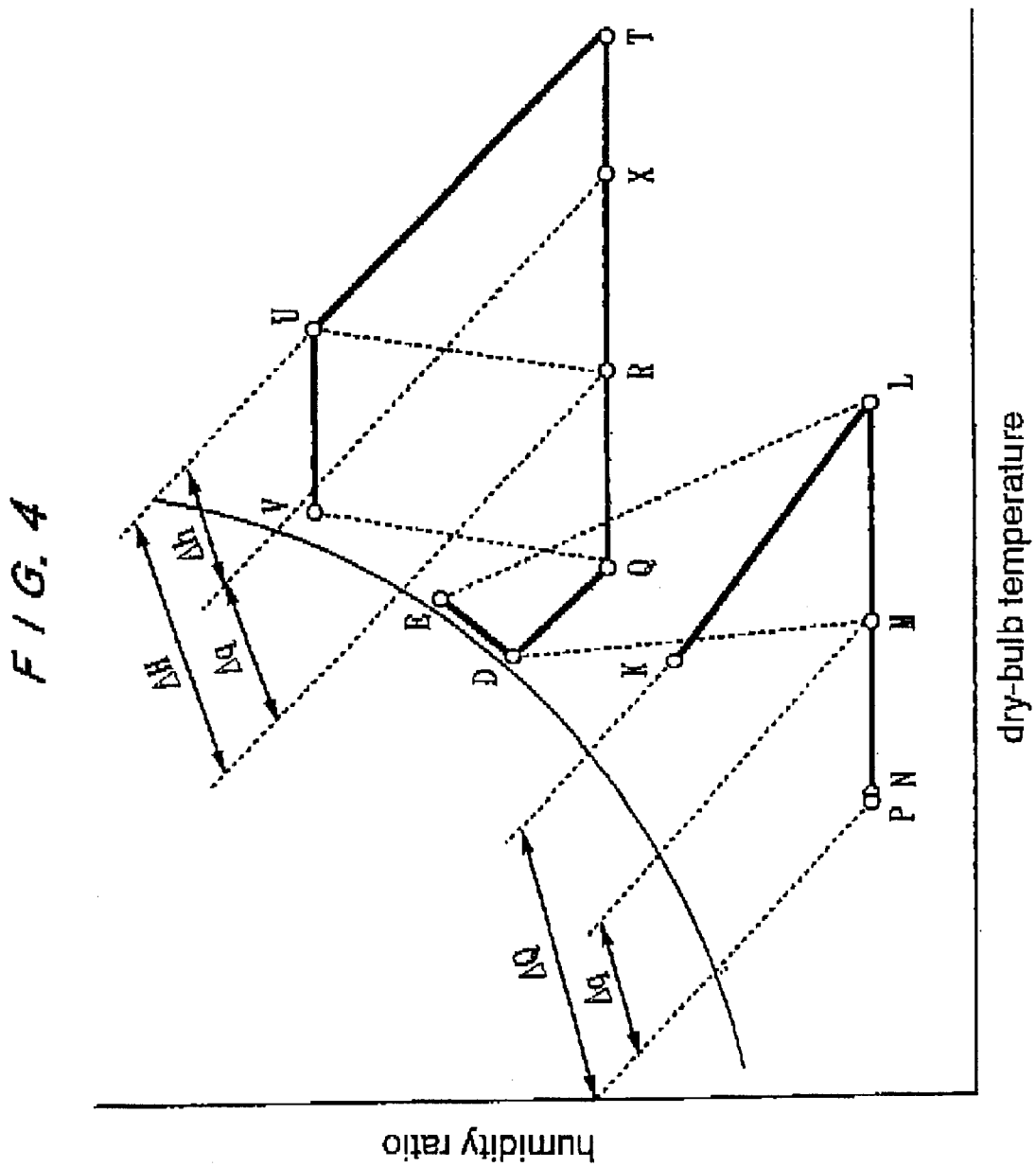
FIG. 4 is a psychrometric chart illustrative of a first mode of operation of the dehumidifying air-conditioning system according to the second embodiment of the present invention.

The dehumidifying mode as the first mode of operation will be described below, FIG. 4 shows an air cycle of this node of operation. In the cycle shown in FIG. 4, since the humidifier 105 in the processing air path is not activated, the state (state P) of the outlet for the processing air becomes the same as the state (state N) of the outlet of the low temperature heat source heat exchanger. Therefore, the humidity ratio of the supply air is lower and the dry-bulb temperature thereof is higher than those in the cooling operation shown in FIG. 10. Since the dry-bulb temperature and humidity ratio of the supply air are lower than those in the air-conditioned space, the states in the air-conditioned space progressively approach preset values, In this mode of operation, because the capability of the compressor 260 increases as the dry-bulb temperature is higher, the temperature and humidity differences of the supply air from preset values increase, resulting in an increased ability to cool and dehumidify the air-conditioned space to the preset values.

Figure 5:
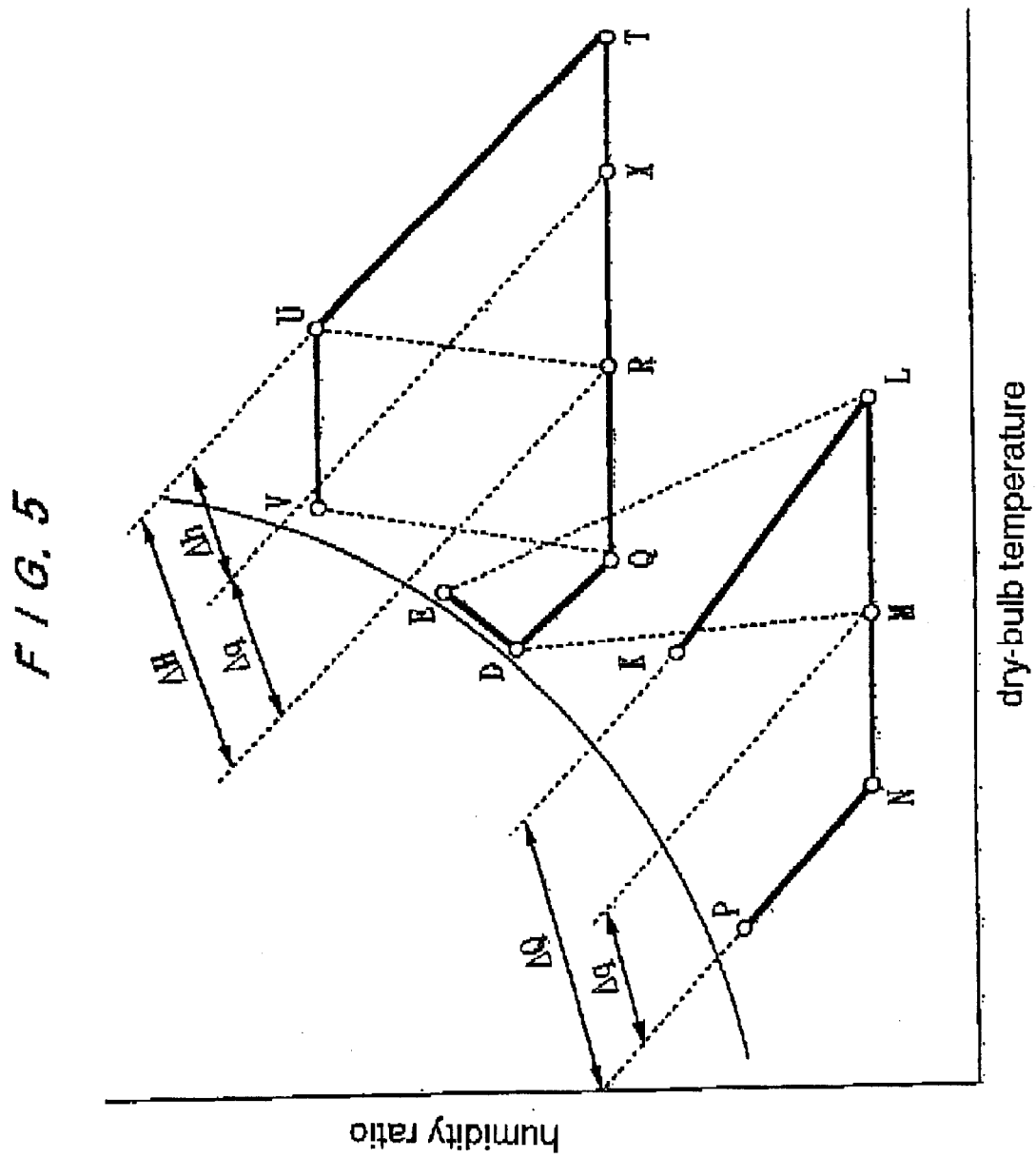
FIG. 5 is a psychrometric chart illustrative of a second mode of operation of the dehumidifying air-conditioning system according to the second embodiment of the present invention.

The cooling mode as the second mode of operation will be described below. FIG. 5 shows an air cycle of this mode of operation. The cycle of the processing air in this mode of operation is the same as that in the cooling mode shown in FIG. 10. However, the process of exchanging heat between the cooling air and the processing air differs from that of the cooling mode shown in FIG. 10, and the cooling effect on the processing air is large because the process varies along a relative humidity curve ranging from 95 to 100%. In this mode of operation, since a dehumidifying ability (latent heat processing ability) can be converted into a sensible heat processing ability by the humidifier 105, the sensible heat processing ability is increased, and loads with various sensible heat factors can be handled. Therefore, inasmuch the dry-bulb of the supply air is lower than that in the air-conditioned space, the states in the air-conditioned space progressively approach preset values. In this mode of operation, because the capability of the compressor 260 increases as the dry-bulb temperature is higher, the temperature difference of the supply air from a preset value increases, resulting in an increased ability to cool the air-conditioned space to the preset value.

Figure 6:
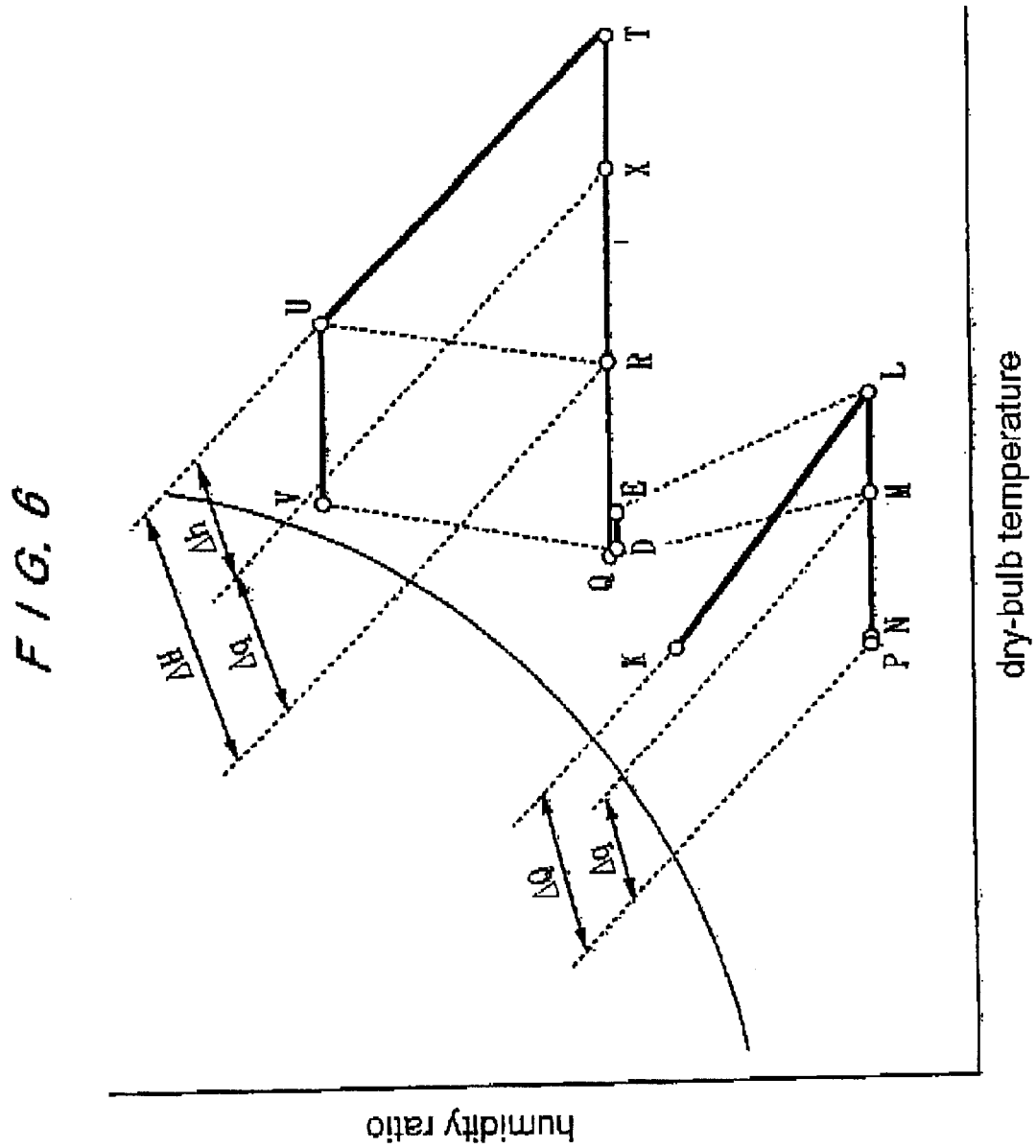
FIG. 6 is a psychrometric chart illustrative of a third mode of operation of the dehumidifying air-conditioning system according to the second embodiment of the present invention.
Figure 7:
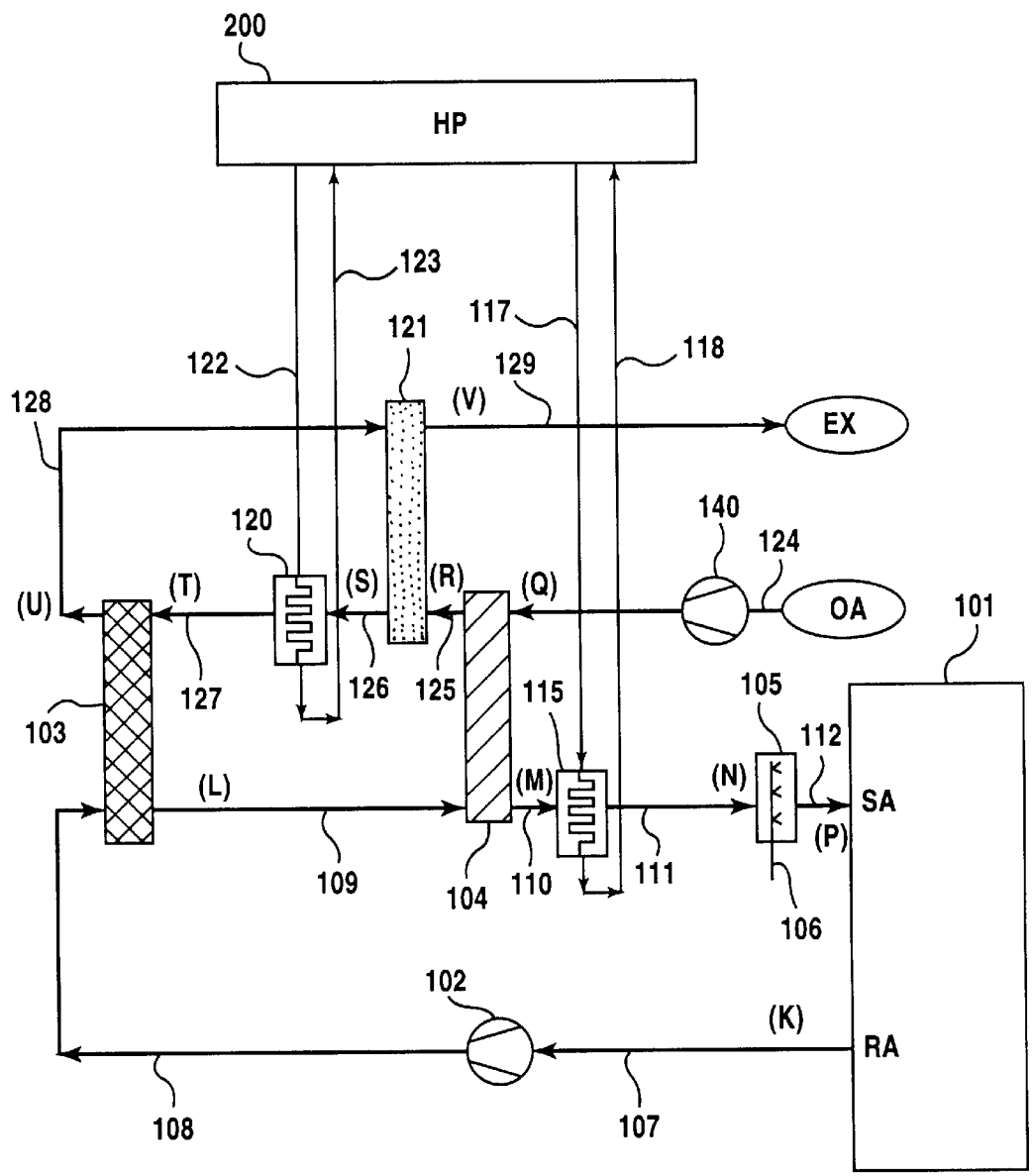
FIG. 7 is a view showing an air-conditioning system comprising a combination of an absorption heat pump and a conventional desiccant air-conditioning unit.
Figure 8:
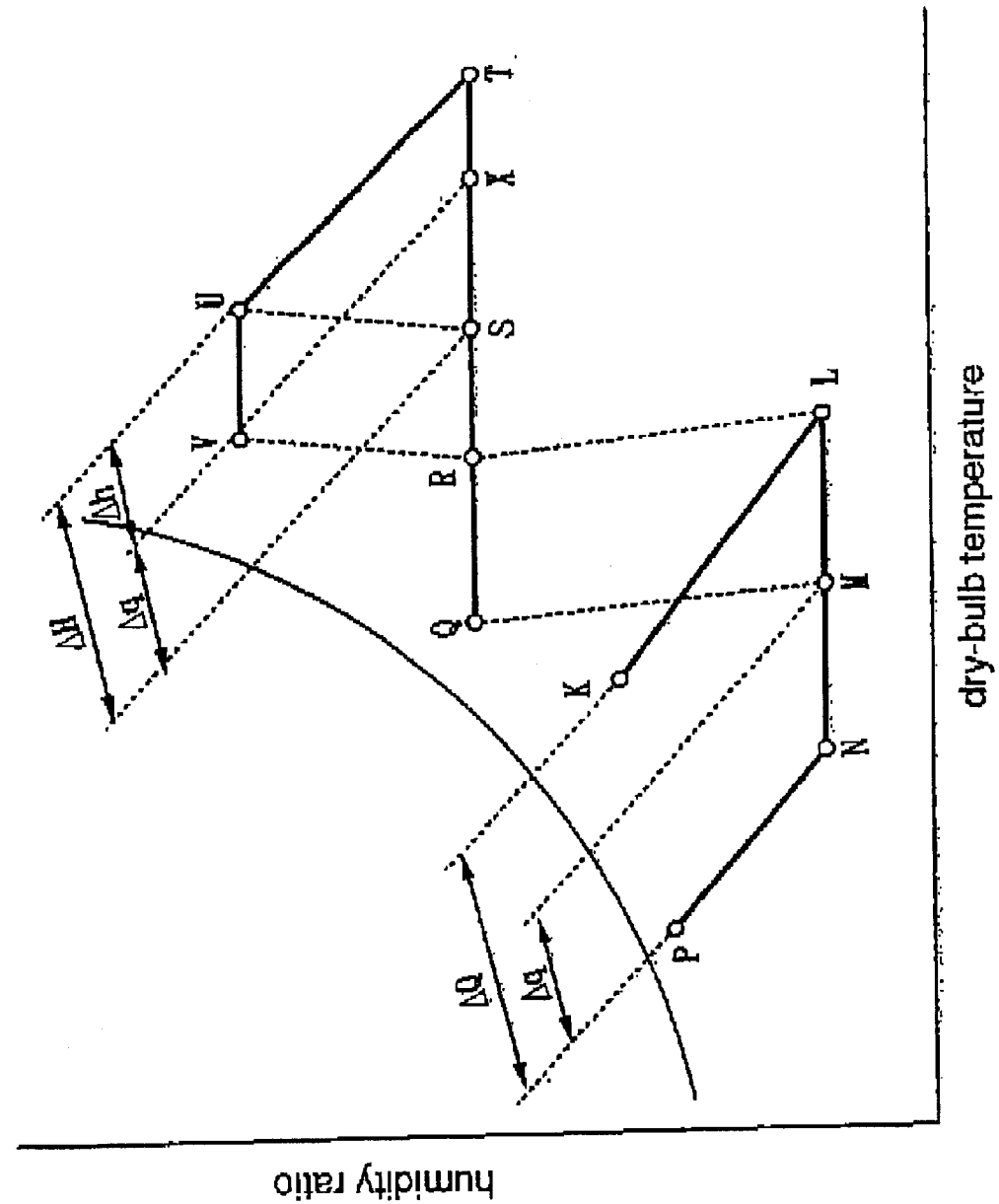
FIG. 8 is a psychrometric chart illustrative of operation of the air-conditioning system shown in FIG. 7.

The weak cooling mode as the third mode of operation will be described below. FIG. 6 shows an air cycle of this mode of operation. As shown in FIG. 6, the water injection mechanism 330 of the heat exchanger assembly 300 is inactivated, and the tan 160 for the cooling air in inverter-controlled to reduce the flow rate of the cooling air. Therefore, the quantity of heat for cooling the processing air of the state L which exchanges heat with the cooling air is reduced to increase the temperature of the state M. Therefore, the temperature of the processing air of the state N after being cooled by the low temperature heat source of the heat pump 200 is also increased, thus reducing the sensible heat processing ability. In this mode of operation, moreover, the capability of the compressor 260 is reduced as the dry-bulb temperature is lower, reducing the cooling capability and the dehumidifying capability of the supply air and increasing the air-conditioning load for thereby humidifying and heating the air-conditioned space to the preset values. By thus lowering the cooling capability and the dehumidifying capability so as to be smaller than the air-conditioning load of the air-conditioned space, the states of the air-conditioned space can be shifted toward the preset values.

The dehumidifying mode as the fourth mode of operation will be described below. The air cycle of this mode of operation is the same as that of the dehumidifying mode shown in FIG. 2 according to the first embodiment. In the operation in which the fan 160 is turned off to stop the flow of the cooling air if the detected dry-bulb temperature is lower than the preset value and the detected humidity is higher than the preset value, the state (state M) of the outlet of the heat exchanger assembly 300 for the processing air is represented by a high temperature as it is not cooled by the cooling air. Hence, the temperature of the processing air at the outlet of the evaporator 115 of the heat pump 200 is high. Since a heat source that can be recovered by the low temperature heat source of the heat pump 200 is ensured, a heat source for regenerating the desiccant can be ensured which is discharged by the high temperature heat source of the heat pump 200 without lower the room temperature. Therefore, even it only a latent heat load is present in the air-conditioned space, since the supply air can be set to a suitable temperature while being lower in humidity than the air-conditioned space, the states of the air-conditioned space can be shifted toward the preset values. In this mode of operation, the capability of the compressor 260 increases as the humidity is higher, and the humidity difference of the supply air from a preset value increases, resulting in an increased ability to humidify the air-conditioned space to the preset value.

In the above four modes of operation, the flow rate of the regenerating air increases and decreases in proportion of the rotational speed of the compressor 260. Specifically, the quantity of heat applied to the regenerating air decreases as the capability of the compressor 260 decreases. Therefore, if the flow rate of the regenerating air is constant, then the regenerating air cannot be heated to a temperature necessary to regenerates the desiccant. In order to avoid this drawback, when the capability of the compressor 260 decreases and the quantity of heat applied to the regenerating air decreases, the flow rate of the regenerating air is reduced to keep the regenerating temperature. Instead of varying the flow rates of the regenerating air in proportion of the rotational speed of the compressor 260, the temperature of the regenerating air outlet or the refrigerant outlet of the high temperature heat source heat exchanger (condenser) 120 may be detected via the path 127 or 202, and the rotational speed of the fan 140 may be controlled to keep the detected temperature constant.

According to the present invention, as described above, the quantity of heat for cooling the processing air which serves as the low temperature heat source for regenerating the desiccant to be dehumidified, by then sensible heat exchanger 104 prior to reaching the low temperature heat source heat exchanger 115 is adjusted to keep a heat load in the low temperature heat source heat exchanger so as to be able to handle an air-conditioning load with a sensible heat factor.

The embodiments of the present invention use the vapor compression heat pump as the heat source. However, as disclosed by the inventors in Japanese laid-open patent publication No. 9-170639, Japanese laid-open patent publication No. 9-170840, Japanese laid-open patent publication No. 9-178286, and Japanese laid-open patent publication No. 9-178287, an air-conditioning system may be arranged such that an absorption heat pump is used and connected to a high temperature heat source heat exchanger and a low temperature heat source heat exchanger by cold and hot water paths, providing the same advantages with respect to the inventions of claims 1 through 4.

According to the present invention, as described above, in a dehumidifying air-conditioning system having a path for processing air to be cooled by a low temperature heat source of a heat pump after moisture is adsorbed therefrom by a desiccant, a path for regenerating air which, after being heated by a high temperature heat source of the heat pump, passes through the desiccant that has adsorbed moisture to regenerate the desiccant, and a path for cooling air for cooling the processing air by exchanging heat with the processing air from which moisture is adsorbed by the desiccant, the arrangement being such that the processing air and the regenerating air alternately flow through the desiccant, the flow rate of the cooling air which passes through a heat exchanger for cooling the processing air is adjusted to variably exchange heat between the processing air and the cooling air. With this arrangement, it is possible to carry out not only an ordinary cooling mode of operation but also a dehumidifying mode of operation to keep the temperature of the processing air outlet high. Therefore, there are thus provided an air-conditioning system which can achieve an excellent dehumidifying capability, can flexibly handle an air-conditioning load, and can save energy, and a method of operating such an air-conditioning system.

INDUSTRIAL APPLICABILITY

The present invention is preferably applicable to an air-conditioning system for use in general houses or larger buildings such as of supermarkets, offices, and others.

What is claimed is:

1. A dehumidifying air-conditioning system having a path for processing air to be cooled by a low temperature heat source of a heat pump after moisture is adsorbed therefrom by a desiccant, a path for regenerating air which, after being heated by a high temperature heat source of the heat pump, passes through the desiccant that has adsorbed moisture to regenerate the desiccant, and a path for cooling air for cooling the processing air by exchanging heat with the processing air from which moisture is adsorbed by the desiccant, the arrangement being such that the processing air and the regenerating air alternately flow through the desiccant, characterized by means for adjusting the flow rate of the cooling air which passes through a heat exchanger for cooling the processing air to variably exchange heat between the processing air and the cooling airs.

2. A method of operating a dehumidifying air-conditioning system constructed according to claim 1, comprising the steps of: detecting the dry-bulb temperature and the humidity of an air-conditioned space, and, when the detected dry-bulb temperature is lower than a preset value and the detected humidity is higher than a preset value, stopping the flow of the cooling air.

3. A dehumidifying air-conditioning system having a path for processing air to be cooled by a low temperature heat source of a heat pump after moisture is adsorbed therefrom by a desiccant, a path for regenerating air which, after being heated by a high temperature heat source of the heat pump, passes through the desiccant that has adsorbed moisture to regenerate the desiccant, and a path for cooling air for cooling the processing air by exchanging heat with the processing air from which moisture is adsorbed by the desiccant, the arrangement being such that the processing air and the regenerating air alternately flow through the desiccant, characterized in that a flow path zone for the processing air and the regenerating air which pass through the desiccant is divided into at least a first zone for adsorbing moisture from the processing air and a second zone for regenerating the desiccant with the regenerating air, the first and second zones being arranged such that the desiccant goes through the first zone and the second zone, and returns to the first zone, said heat pump being arranged for a low temperature heat source heat exchanger to exchange heat with the processing air and for a high temperature heat source heat exchanger to exchange heat with the regenerating air, the path for processing air being arranged to extend from an inlet for the processing air via said first zone, a first sensible heat exchanger, said low temperature heat source heat exchanger, and a first humidifier, to an outlet for the processing air, the path for regenerating air being arranged to extend from an inlet for the regenerating air via a second sensible heat exchanger, said high temperature heat source heat exchanger, said second zone, and the second sensible heat exchanger, to an outlet for the regenerating air, the path for cooling air being arranged to extend from an inlet for the cooling air via a second humidifier and the first sensible heat exchanger to an outlet for the cooling air, the arrangement being such that the processing air and the cooling air are in heat exchanging relationship to each other in the first sensible heat exchanger, and the regenerating air and the regenerating air are in heat exchanging relationship to each other in the second sensible heat exchanger, and the flow rate of said cooling air is adjusted to variably exchange heat between the processing air and the cooling air.

4. A dehumidifying air-conditioning system according to claim 3, characterized in that the desiccant is in the shape of a wheel, and rotates to go through the first zone and the second zone, and return to the first zone.

5. A method of operating in an air-conditioned space, a dehumidifying air conditioning system having a structure as recited in either one of claim 3 or claim 4 and wherein the heat pump comprises a vapor compression heat pump having a compressor, said method comprising the steps of:

detecting a dry-bulb temperature and a humidity of air in said air-conditioned space;

when the dry-bulb temperature is higher than a preset value and the humidity is higher than a preset value, operating said system in a first mode of operation in which the heat of the cooling air is exchanged with the processing air, the first humidifier is inactivated, and the compressor is operated with a growing capability as the absolute value of the difference between the dry-bulb temperature and the preset value therefor increases;

when the dry-bulb temperature is higher than the preset value and the humidity is lower than the preset value, operating said system in a second mode of operation in which the heat of the cooling air is exchanged with the processing air, the first humidifier is operated, and the compressor is operated with a growing capability as the absolute value of the difference between the dry-bulb temperature and the preset value therefor increases;

when the dry-bulb temperature is lower than the preset value and the humidity is lower than the preset value, operating the system in a third mode of operation in which the cooling air is caused to exchange heat with the processing air while the flow rate of the cooling air is reduced as the absolute value of the difference between the dry-bulb temperature and the preset value therefor increases, the first humidifier is inactivated, and the compressor is operated with a decreasing capability as the absolute value of the difference between the dry-bulb temperature and the preset value therefor increases; and when the dry-bulb temperature is lower than the preset value and the humidity is higher than the preset value, operating the system in a fourth mode of operation in which the flow of the cooling air is stopped, the first and second humidifiers are inactivated, and the compressor is operated with a growing capability as the absolute value of the difference between the humidity and the preset value therefor increases.

* * * * *